(12) United States Patent
Faure et al.

(10) Patent No.: US 6,838,857 B2
(45) Date of Patent: Jan. 4, 2005

(54) PROTECTION DEVICE USING 1S CIRCUITS, FOR A BATTERY ASSEMBLY OF ELECTROCHEMICAL CELLS

(75) Inventors: Frëdëric Faure, Poitiers (FR); Jean-François Savin, St Benoit (FR); Serge Maloizel, Trois Palis (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/615,573

(22) Filed: Jul. 10, 2003

(65) Prior Publication Data
US 2004/0119444 A1 Jun. 24, 2004

(30) Foreign Application Priority Data
Jul. 11, 2002  (FR) ............................................. 02 08730

(51) Int. Cl.⁷ ................................................ H02J 7/00
(52) U.S. Cl. ...................................................... 320/134
(58) Field of Search ................................ 320/134, 121, 320/139

(56) References Cited

U.S. PATENT DOCUMENTS

| | | | | |
|---|---|---|---|---|
| 5,929,593 A | * | 7/1999 | Eguchi | 320/139 |
| 6,051,955 A | * | 4/2000 | Saeki et al. | 320/121 |
| 6,060,864 A | | 5/2000 | Ito et al. | 320/136 |

FOREIGN PATENT DOCUMENTS

EP   0 880 214 A2   11/1998

* cited by examiner

Primary Examiner—Pia Tibbits
(74) Attorney, Agent, or Firm—Sughrue Mion, PLLC

(57) ABSTRACT

A battery assembly comprises at least two electrochemical cell modules (1-i) connected in series and each comprising at least one electrochemical cell (2), associated with a protection device comprising as many primary protection blocks (5-i) as there are electrochemical cell modules (1-i), each block (5-i) being connected in parallel with a respective one of the electrochemical cell modules (1-i) and comprising at least one 1S type electronic protection circuit (6) and a diode (7) connected in parallel with the 1S circuit and upstream therefrom relative to the current flow direction.

11 Claims, 3 Drawing Sheets

PROTECTION DEVICE USING 1S CIRCUITS, FOR A BATTERY ASSEMBLY OF ELECTROCHEMICAL CELLS

The invention relates to the field of batteries of electrochemical cells, and more particularly to the field of protection devices that are fitted to certain rechargeable batteries.

Numerous batteries are made up of modules each comprising one or more secondary or rechargeable electrochemical cells (also known as accumulators), and they are fitted with a protection circuit to ensure that they are not subjected to overcharging or to discharging at too high a rate. This applies in particular to batteries of the lithium-ion (or Li-ion) type which are fitted to certain mobile telephones. Amongst circuits well known to the person skilled in the art, mention can be made in particular of those referred to as "nS" type circuits where n generally lies in the range 1 to 10 depending on the number n of modules of electrochemical cells connected in series within a battery assembly.

The term "nS" circuit is used herein to designate an electronic circuit comprising in particular an integrated circuit (IC) connected in parallel with n modules of electrochemical cells connected in series. An example of a prior art 1S circuit is shown in FIG. 1, coupled to an electrochemical cell BAT. The 1S circuit which is described in detail below includes in particular an integrated circuit IC coupled to components such as field-effect transistors (FETs) Q1 that perform switching, capacitors Cj, resistors Rk, and a zener diode ZD.

When at least two electrochemical cells are to be connected in series, it is then necessary to use a 2S, 3S, or 4S electronic circuit. FIG. 2 is a diagram showing a prior art battery assembly conventionally comprising four electrochemical cell modules 1-$i$ ($i$=1 to 4), each comprising two electrochemical cells 2 such as rechargeable Li-ion cells, coupled to a protection device 3 having a 4S electronic circuit which is represented by its integrated circuit 4.

Such a protection device is bulky and constricting because of the cabling it requires for connection in series and for connecting the circuit to midpoints between cells. In addition, because of the freedom with which the circuit can be positioned, it makes it necessary to have a specific configuration for each type of battery.

Furthermore, it is difficult to test circuits coupled to modules of cells in an industrial context insofar as the positions of the circuits vary from one battery to another when they are not integrated on an interconnection card.

In addition, the wide variety of nS protection devices makes them difficult to standardize.

An object of the invention is thus to remedy the above-mentioned drawbacks in full or in part.

To this end, the invention provides a protection device for a battery assembly comprising at least two electrochemical cell modules, connected in series and each comprising at least one electrochemical cell.

The device is characterized by the fact that it comprises as many primary protection blocks as electrochemical cell modules, each block being connected in parallel with one of said electrochemical cell modules, and comprising at least one 1S type electronic protection circuit, and a diode connected in parallel with said 1S electronic circuit and upstream therefrom relative to the current flow direction.

As a result, regardless of whether the battery assembly has 2, 3, 4, or n modules of electrochemical cells, protection devices make use only of 2, 3, 4, or n electronic circuits all of 1S type. In other words, instead of using a protection device fitted with a single nS type electronic circuit, a protection device is used that is fitted with n 1S type electronic circuits. Consequently, on going from one type of battery to another, it suffices to adapt the protection device as a function in particular of the required threshold currents.

Furthermore, when a protection device detects excessive discharging in the cell module to which it is coupled in parallel, its diode serves to bypass said module so that the other cells in series can discharge, thus rebalancing the battery assembly.

The device may include one or more "secondary" protection blocks connected in parallel with respective primary protection blocks and comprising at least one 1S type electronic protection circuit and a diode connected in parallel with the 1S electronic circuit and upstream therefrom in the current flow direction. These secondary protection blocks are advantageously identical to the primary protection blocks. This enables the device to be adapted as a function of the current thresholds that can be withstood by certain components, for example the main switching devices of the 1S circuits when they are of the metal oxide semiconductor field effect transistor (MOSFET) type.

Instead of connecting primary and secondary protection blocks in parallel, in order to facilitate cabling it is possible to connect in parallel within a primary protection block at least one auxiliary switch device, e.g. of the MOSFET type, and a main switch device, also of the MOSFET type.

Furthermore, each primary protection block and/or each secondary protection block may include an "internal" fuse connected between an output of its protection circuit and the output of its diode. The fuse may be a thermofuse (or a current limiting thermostat) so as to protect certain components of the protection block, such as the MOSFETs of the switch device, for example. However, instead of using internal fuses, it may be preferable to use external fuses.

The device may also include an auxiliary diode connected in parallel between the input of the primary protection block associated with the electrochemical cell module placed furthest upstream relative to the current flow direction, and the output of the primary protection block associated with the electrochemical cell module placed furthest downstream relative to said current flow direction. The auxiliary diode serves to rebalance the battery assembly. In addition, that makes it possible to extend the battery assembly to more than four cell modules in series. However in a variant, it is also possible to provide a "midpoint".

The invention also provides a battery comprising at least two electrochemical cell modules connected in series, each comprising at least one electrochemical cell, and coupled to a protection device of the type described above.

Furthermore, the invention is particularly well adapted to battery assembly assemblies in which the electrochemical cells are selected from the group comprising at least lithium cells, such as lithium-ion (Li-ion) cells, and polymer cells, for example.

Other characteristics and advantages of the invention appear on examining the following detailed description and the accompanying drawings, in which.

The accompanying drawings are for the most part definitive in character. Consequently they may serve not only to describe the invention, but they may also contribute to defining it, where appropriate.

Figure 3:
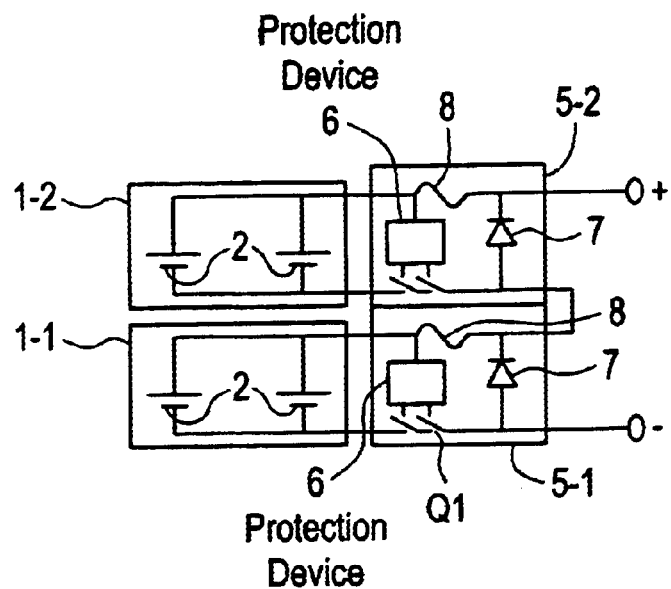
FIG. 3 is a diagram of an embodiment of a battery assembly of the invention comprising two electrochemical cell modules connected in series and coupled to a protection device of the invention of the "2×1S" type.

Reference is made initially to FIG. 3 to describe a first embodiment of a battery assembly of the invention.

In this first example, the battery assembly comprises firstly two electrochemical cell modules 1-1 and 1-2 connected in series, each comprising two electrochemical cells 2, such as rechargeable cells of the lithium-ion (Li-ion) type.

In order to monitor charging and discharging, the battery assembly also includes a protection device having as many primary protection blocks 5-$i$ (in this case i=1,2) as there are electrochemical cell modules 1-$i$.

Each primary protection block 5-1 or 5-2 is connected in parallel with one of the electrochemical cell modules 1-1 and 1-2, and comprises at least one "1S " type electronic protection circuit 6 represented in FIG. 3 by its integrated circuit IC, and a diode 7 connected in parallel with the 1S electronic circuit 6 and upstream therefrom relative to the direction in which current flows between the connection terminals represented by the symbols "−" and "+".

Preferably, each primary protection block 5-$i$ includes an internal fuse 8 connected between the output of its protection circuit 6 and the output of its diode 7. By way of example, the fuse may be a 5-amp time delay fuse of the type sold by the supplier SOC under the reference MMCT5A. However, it is possible to use other current ratings, such as 7 amps, 8 amps, or 10 amps.

The type of fuse may be selected so that it also provides thermal protection for certain components of the protection block, for example the MOSFETs. Under such circumstances, it is thermofuse or a current-limiter thermostat.

In a variant, instead of integrating the fuse in the primary protection block 5-$i$, it is possible to use an external fuse.

The diode 7 is preferably rated to withstand currents lying in the range 1 amp to 5 amps. For example it may be a 3-amp diode of the type S3A. Numerous types of diode can be used. Nevertheless, it is preferable to avoid using a Schottky type diode because of its high level of electricity consumption.

Figure 1:
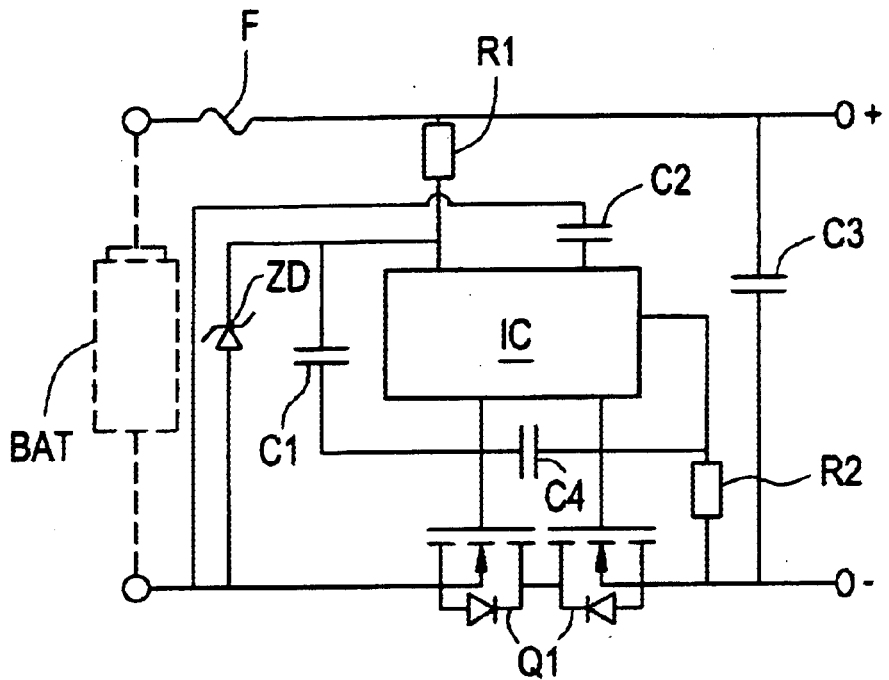
FIG. 1 is a diagram of a prior art protection circuit of the 1S type.
Figure 2:
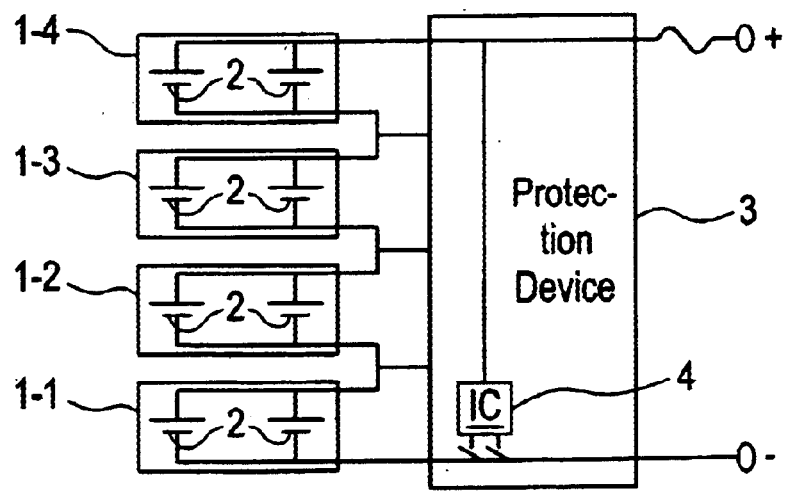
FIG. 2 is a diagram of a prior art battery assembly comprising four electrochemical cell modules connected in series and coupled to an electronic circuit of the 4S type.

The 1S protection circuit is, for example, of the same type as that shown in FIG. 1. In which case, it mainly comprises:

an integrated circuit IC;

two field-effect transistors Q1 constituting the main switch device, the transistors preferably being of the MOSFET type, and presenting impedances of a few tens of milliohms (mΩ), for example;

a resistor R1 preferably of quarter watt rating and 5% type, and having a resistance of a few hundreds of ohms (Ω), for example;

a resistor R2, preferably of the 5% type, and having a resistance of kiloohm (kΩ) order, for example;

a capacitor C1, preferably of the Y5V ceramic type, rated at 25 volts and presenting capacitance of the order of one tenth of a microfarad ($\mu$F), for example;

a capacitor C2, preferably of the X7R ceramic type, rated at 16 volts and presenting capacitance of the order of one tenth of a microfarad ($\mu$F), for example;

a capacitor C3, preferably of the Y5V ceramic type, rated at 25 volts and presenting capacitance of the order of one tenth of a microfarad ($\mu$F), for example;

a capacitor C4, preferably of the Y5V ceramic type, rated at 25 volts and presenting capacitance of the order of one tenth of a microfarad ($\mu$F), for example; and a zener diode ZD.

Naturally, this example of a 1S circuit is not limiting. Any other 1S type electronic protection circuit could be used to implement the invention.

The 1S electronic circuit 6 serves conventionally to monitor the state of charge of the electrochemical cell module 1-$i$ with which its primary protection block 5-$i$ is coupled in parallel so as to avoid overcharging and discharging at too great a rate. More precisely, it continuously compares the voltage across the terminals of the electrochemical cell 1-$i$ with a minimum threshold voltage, e.g. equal to about 2.5 volts (V), and with a maximum threshold voltage, e.g. equal to about 4.2 V. Whenever the voltage of the electrochemical cell module 1-$i$ drops below the minimum threshold voltage, or rises above the maximum threshold voltage, the integrated circuit IC operates the MOSFET Q1 so as to open its circuit, thereby causing the electrochemical cell module 1-$i$ to cease discharging or charging. The presence of the diode 7 then allows current to be bypassed towards the following primary protection block coupled to the following electrochemical cell module. It is thus possible to continue discharging the other cell modules connected in series, and thus balance the battery assembly.

Balancing is obtained by so-called "deep" discharging, i.e. via a resistor, or by feeding a current that is not too great, by opening the circuit 6 of each primary protection block 5-$i$ on its low threshold (or minimum threshold voltage). Since voltage varies a great deal in the vicinity of the low threshold, it is therefore easy to obtain rebalancing efficiently.

Figure 4:
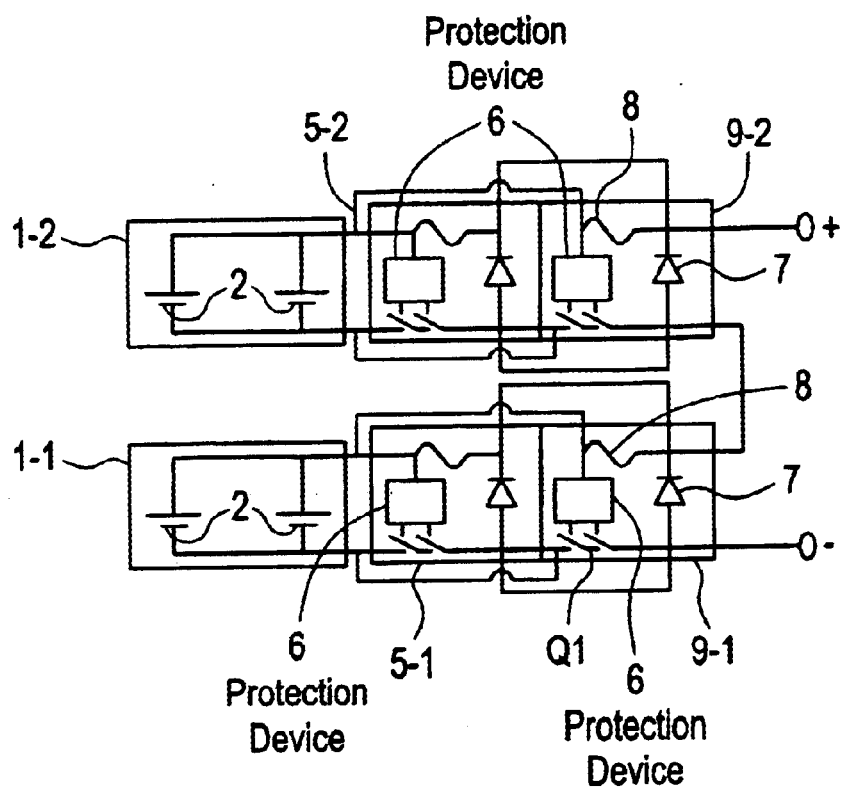
FIG. 4 shows a first variant of the FIG. 3 embodiment.

Reference is now made to FIG. 4 while describing a first variant of the protection device shown in FIG. 3.

In this variant, the device includes secondary protection blocks 9-$i$. More precisely, each primary protection block 5-$i$ is coupled in parallel with at least one secondary protection block 9-$i$. This variant can be used in particular when the MOSFET Q1 of the main switch device of the 1S protection circuit are not capable of carrying the current.

Each secondary protection block 9-$i$ is constituted in substantially the same manner as a primary protection block 5-$i$. Consequently, it comprises at least one 1S type electronic protection circuit 6 represented in FIG. 4 by its integrated circuit, and a diode 7 connected in parallel with the 1S electronic circuit 6 and upstream therefrom relative to the direction in which current flows between the connection terminals represented by the symbols "−" and "+". Each primary protection block 9-$i$ may include an internal fuse 8 connected between the output of its protection circuit 6 and the output of its diode 7. However, it may be more advantageous to use external fuses.

Also preferably, the secondary protection block 9-$i$ presents characteristics which are identical to those of the primary protection block 5-$i$. Furthermore, each primary protection block 5-$i$ is not necessarily coupled in parallel with a single secondary protection block 9-$i$. It may be necessary in some circumstances to put each electrochemical cell module 1-$i$ in parallel with three or four protection blocks.

Figure 5:
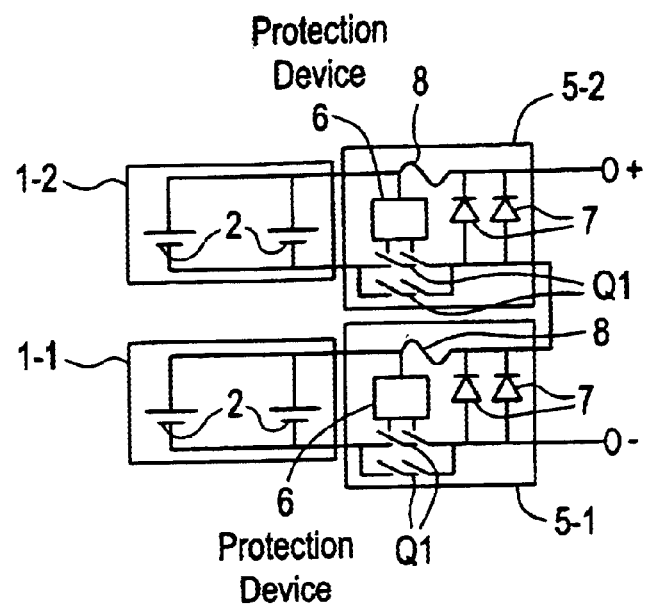
FIG. 5 shows a second variant of the FIG. 3 embodiment.

Reference is now made to FIG. 5 in order to describe a second variant of the protection device shown in FIG. 3.

In this variant, instead of putting a plurality of protection blocks 5-$i$ and 9-$i$ in parallel as in the preceding variant, each primary protection block 5-$i$ has connected in parallel with the main switch device Q1 at least one auxiliary switch device likewise constituted by MOSFETs Q1. The MOSFETs Q1 that are connected in parallel are preferably identical, but they could alternatively present different impedances.

Furthermore, in this variant, as can be seen in FIG. 5, it is also possible within each primary protection block 5-$i$ to connect two diodes 7 in parallel with each 1S electronic circuit 6, on the upstream side thereof.

The characteristics of the components constituting the 1S circuit 6, the diodes 7 and 10, and the fuse 8 are naturally selected as a function specifically of the maximum permissible current, the trigger voltages, and the type of electrochemical cell.

Figure 6:
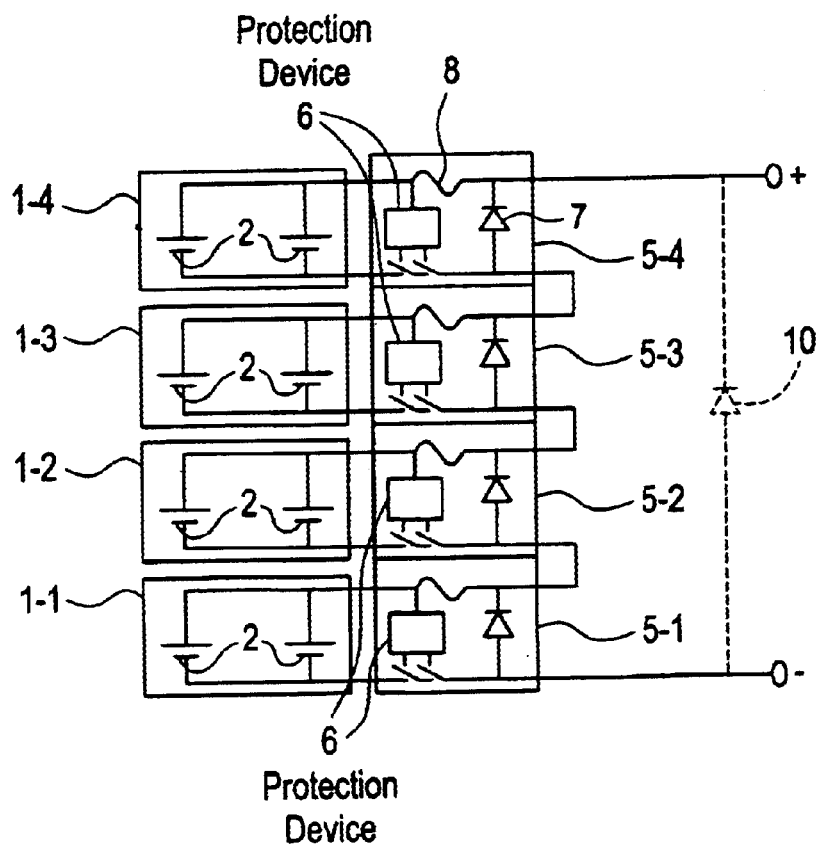
FIG. 6 is a diagram of an embodiment of a battery assembly of the invention comprising four electrochemical cell modules connected in series and coupled to a protection device of the invention of the "4×1S" type.

Reference is now made to FIG. 6 to describe another example of a protection device. This example differs from that shown in FIG. 3 in the number of electrochemical cell modules 1-$i$ in the battery assembly, and consequently in the number of primary protection blocks 5-$i$ of the protection device. In this case there are four electrochemical cell modules 1-1 to 1-4 coupled respectively to four primary protection blocks 5-1 to 5-4.

Consequently, instead of having a 2×1S type protection device, there is a 4×1S type device. The operation of this battery assembly is thus identical to that of the battery assembly of FIG. 3.

Naturally, as in the variants of FIGS. 4 and 5, the protection device of FIG. 6 may include secondary protection blocks 9-$i$ should that be necessary, or indeed a plurality of switching MOSFETs.

Furthermore, as shown in dashed lines in FIG. 6, the protection device of the invention may also have an auxiliary diode 10 connected in parallel between the input of the primary protection block 5-$i$ associated with the electrochemical cell module 1-1 that is placed furthest upstream relative to the current flow direction, and the output of the primary protection block 5-4 associated with the electrochemical cell module 1-4 that is placed furthest downstream relative to said current flow direction. This auxiliary diode 10 is substantially of the same type as the other diodes 7 and it is connected between the "−" and "+" terminals of the battery assembly. It is particularly useful when the balancing discharge current and the threshold voltage of the diodes are limited. This embodiment is thus particularly suitable for battery assemblies having at least three or four electrochemical cell modules 1-$i$. It makes it possible to extend the battery assembly to more than four cell modules in series, for example to several groups of three or four electrochemical cell modules. It is thus possible, for example, to make up two groups of three or four modules each, or three or four groups of three modules, possibly combined with another group of two modules or comprising a single module. The particular combination chosen is selected in such a manner as to minimize the number of diodes, and preferably to avoid having more than four modules connected without any auxiliary diode.

However, in a variant, it is possible to provide a "midpoint" instead of an auxiliary diode. For this purpose, and depending on the number of modules, it is possible to use a connector having four terminals or six terminals, or even more.

The invention makes it possible to use protection blocks comprising only 1S type electronic circuits, thus making it possible to standardize protection circuits.

Furthermore, since each electrochemical cell module is coupled to a protection block of the protection device of the invention which is suitable for being installed inside the lid of the battery assembly, the position of the protection block becomes substantially predetermined, which enables said protection block coupled to the electrochemical cell module to be tested under industrial circumstances.

Furthermore, since the device can be received in the lid of the battery assembly, it becomes possible to reduce the overall size of battery assemblies.

Finally, by means of the invention, genuinely effective balancing can be obtained between the various electrochemical cell modules of the battery assembly.

The invention is not limited to making protection devices and battery assemblies as described above, merely by way of example, but covers any variant that could be envisaged by the person skilled in the art within the ambit of the following claims.

What is claimed is:

1. A protection device for a battery assembly comprising at least two electrochemical cell modules (1-$i$), connected in series and each comprising at least one electrochemical cell (2), the device being characterized in that it comprises as many primary protection blocks (5-$i$) as electrochemical cell modules (1-$i$), each block (5-$i$) being connected in parallel with one of said electrochemical cell modules (1-$i$), and comprising at least one 1S type electronic protection circuit (6), and a diode (7) connected in parallel with said 1S electronic circuit (6) and upstream therefrom relative to the current flow direction.

2. A protection device according to claim 1, characterized in that said battery assembly comprises three electrochemical cell modules (1-$i$), and the device comprises three primary protection blocks (5-$i$) each connected in parallel with a respective one of said electrochemical cell modules.

3. A protection device according to claim 1, characterized in that said battery assembly comprises four electrochemical cell modules (1-$i$), and the device comprises four primary protection blocks (5-$i$) each connected in parallel with a respective one of said electrochemical cell modules.

4. A protection device according to claim 1, characterized in that it includes a secondary protection block (9-$i$) connected in parallel with one of said primary protection blocks (5-$i$), and comprising at least one 1S type electronic protection circuit (6) and a diode (7) connected in parallel with said 1S electronic circuit and upstream therefrom relative to the current flow direction.

5. A protection device according to claim 1, characterized in that each primary protection block (5-$i$) includes a main switch device (Q1) connected in parallel with at least one auxiliary switch device (Q1).

6. A protection device according to claim 1, characterized in that each primary protection block (5-$i$) and/or each secondary protection block (9-$i$) includes a fuse (8) connected between an output of said protection circuit (6) and an output of said diode (7).

7. A protection device according to claim 6, characterized in that each fuse (8) is a thermofuse.

8. A protection device according to claim 4, characterized in that at least some of said secondary protection blocks (9-$i$) are identical to the respective primary protection blocks (5-$i$) with which they are connected in parallel.

9. A protection device according to claim 1, characterized in that it includes an auxiliary diode (10) connected in parallel between an input of the primary protection block (5-1) associated with the electrochemical cell module (1-1) placed furthest upstream relative to the current flow direction, and an output of the primary protection block (5-4) associated with the electrochemical cell module (1-4) placed furthest downstream relative to said current flow direction.

10. A battery assembly comprising at least two electrochemical cell modules (1-$i$) connected in series and each comprising at least one electrochemical cell (2), the battery assembly being characterized in that it includes a device according to claim 1.

11. A battery assembly according to claim 10, characterized in that each electrochemical cell (2) is selected from the group comprising at least lithium cells, and in particular lithium-ion (Li-ion) cells and polymer cells.

* * * * *